(12) United States Patent
Li et al.

(10) Patent No.: US 12,327,301 B2
(45) Date of Patent: Jun. 10, 2025

(54) METHOD AND APPARATUS FOR CONFIGURING COLOR, DEVICE, MEDIUM AND PRODUCT

(71) Applicant: Beijing Baidu Netcom Science Technology Co., Ltd., Beijing (CN)

(72) Inventors: Yanyan Li, Beijing (CN); Dejing Dou, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 445 days.

(21) Appl. No.: 17/650,214

(22) Filed: Feb. 7, 2022

(65) Prior Publication Data

US 2022/0156988 A1 May 19, 2022

(30) Foreign Application Priority Data

Jun. 30, 2021 (CN) .......................... 202110734333.7

(51) Int. Cl.
*G06T 11/00* (2006.01)
*G06T 7/90* (2017.01)
*G06T 11/20* (2006.01)

(52) U.S. Cl.
CPC .............. *G06T 11/001* (2013.01); *G06T 7/90* (2017.01); *G06T 11/206* (2013.01); *G06T 2207/30176* (2013.01)

(58) Field of Classification Search
None
See application file for complete search history.

(56) References Cited

U.S. PATENT DOCUMENTS

| 7,705,856 B2 | 4/2010 | Tanaka et al. |
| 7,925,082 B2 | 4/2011 | Itoh |
| 2008/0316553 A1* | 12/2008 | Tanaka ..................... G06T 11/60 358/518 |

(Continued)

FOREIGN PATENT DOCUMENTS

| CN | 1973303 A | 5/2007 |
| CN | 101030251 A | 9/2007 |

(Continued)

OTHER PUBLICATIONS

Stack Overflow, "Optimizing for Vector Using Optimize R"; posted May 23, 2017, https://stackoverflow.com/questions/16410400/optimizing-for-vector-using-optimize-r (Year: 2017).*

(Continued)

*Primary Examiner* — Sarah Le
(74) *Attorney, Agent, or Firm* — Knobbe, Martens, Olson & Bear, LLP

(57) ABSTRACT

Embodiments of the present disclosure provide a method, an apparatus, a device, a medium and a product for configuring a color, relates to the field of computer technology, and particularly to the data visualization technology. A specific implementation comprises: acquiring a set of chart entities in a chart; determining target color information corresponding to the chart entities in the set of the chart entities based on a preset target function and a constraint condition; and configuring colors corresponding to the chart entities in the set of the chart entities based on the target color information.

18 Claims, 5 Drawing Sheets

(56) References Cited

U.S. PATENT DOCUMENTS

| | | | |
|---|---|---|---|
| 2009/0102846 A1* | 4/2009 | Flockermann | G06T 11/206 |
| | | | 345/530 |
| 2015/0379739 A1 | 12/2015 | Dorner et al. | |
| 2017/0223326 A1 | 8/2017 | Feris et al. | |
| 2020/0159867 A1 | 5/2020 | Sharma et al. | |
| 2021/0042965 A1* | 2/2021 | Phogat | G06V 10/763 |
| 2022/0343561 A1* | 10/2022 | Aggarwal | G06T 7/90 |

FOREIGN PATENT DOCUMENTS

| | | |
|---|---|---|
| CN | 109597975 A | 4/2019 |
| CN | 110825472 A | 2/2020 |
| CN | 111292394 A | 6/2020 |
| CN | 111314614 A | 6/2020 |
| CN | 111427640 A | 7/2020 |
| CN | 111429539 A | 7/2020 |
| CN | 112597745 A | 4/2021 |
| CN | 112966469 A | 6/2021 |
| EP | 3 285 474 A1 | 2/2018 |
| EP | 3410402 A1 | 12/2018 |

OTHER PUBLICATIONS

Zhang, Yao, et al. "Toward automated assessment of mole similarity on dermoscopic images." Journal of Medical Imaging, Feb. 10, 2021 (Year: 2021).*

Kim et al., "A Rule-Based Method for Table Detection in Website Images," *IEEE Access*, vol. 8, pp. 81022-81033.(2020).

Lei et al., "Text2Palette: Text-Driven Color Palette Generation Using Internet Images," *Journal of Computer-Aided Design & Computer Graphics*, vol. 33(5), pp. 695-703 (2021).

Lia et al., "Regional weighted comentropy and its application in image feature extraction," *Journal of Computer Applications*, vol. 29(2), pp. 3341-3342 (2009).

* cited by examiner

METHOD AND APPARATUS FOR CONFIGURING COLOR, DEVICE, MEDIUM AND PRODUCT

CROSS-REFERENCE TO RELATED APPLICATIONS

This application claims priority to Chinese Patent Application No. 202110734333.7, filed with the China National Intellectual Property Administration (CNIPA) on Jun. 30, 2021, the content of which is incorporated herein by reference in its entirety.

TECHNICAL FIELD

Embodiments of the present disclosure relate to the field of computer technology, particularly to the data visualization technology, and are specifically applicable to a scenario where a color is configured for a chart entity.

BACKGROUND

At present, when a chart is generated, it is often required to configure a color for each chart entity in the chart, for example, configure a color for each legend in the chart.

In the color configuration approach commonly used now, the color is required to be manually configured. For example, an experienced personnel determines the color required to be configured for the each chart entity in the chart based on past experience. However, there is a problem of low color configuration efficiency in the manual configuration.

SUMMARY

Embodiments of the present disclosure provide a method, apparatus, a device, a medium and a product for configuring a color.

According to an aspect of the present disclosure, some embodiments of the present disclosure provide a method for configuring a color, including: acquiring a set of chart entities in a chart; determining target color information corresponding to the chart entities in the set of the chart entities based on a preset target function and a constraint condition; and configuring colors corresponding to the chart entities in the set of the chart entities based on the target color information.

According to another aspect of the present disclosure, some embodiments of the present disclosure provide an apparatus for configuring a color, including: a chart entity acquiring unit, configured to acquire a set of chart entities in a chart; a color determining unit, configured to determine target color information corresponding to the chart entities in the set of the chart entities based on a preset target function and a constraint condition; and a color configuring unit, configured to configure colors corresponding to the chart entities in the set of the chart entities based on the target color information.

According to another aspect of the present disclosure, some embodiments of the present disclosure provide an electronic device, including: one or more processors; and a memory configured to store one or more programs, wherein, the one or more processors, when executing the one or more programs, perform any one of above methods for configuring a color.

According to another aspect of the present disclosure, some embodiments of the present disclosure provide a non-transitory computer readable storage medium storing a computer instruction, wherein the computer instruction is used to cause a computer to perform any one of above methods for configuring a color.

According to another aspect of the present disclosure, some embodiments of the present disclosure provide a computer program product including a computer program, wherein the computer program, when executed by a processor, implements any one of above methods for configuring a color.

According to the technology of some embodiments of the present disclosure, a method for configuring a color is provided, which can improve the efficiency of the configuration of the colors.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the technical solution of the present disclosure, and do not constitute a limitation to the present disclosure. Here.

DETAILED DESCRIPTION OF EMBODIMENTS

Embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

It should be noted that embodiments in the present disclosure and the features in the embodiments may be combined with each other on a non-conflict basis. Embodiments of the present disclosure will be described below in detail with reference to the accompanying drawings.

Figure 1:
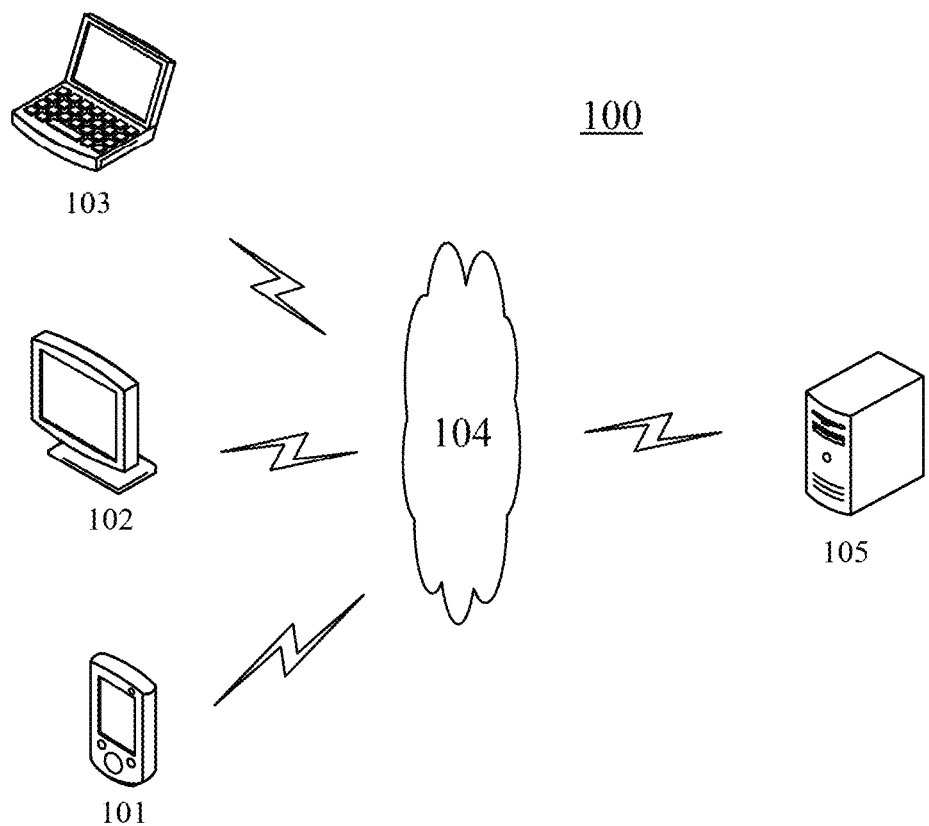
FIG. 1 is a diagram of an example of system architecture in which an embodiment of the present disclosure may be applied.

As shown in FIG. 1, a system architecture 100 may include terminal devices 101, 102 and 103, a network 104 and a server 105. The network 104 serves as a medium providing a communication link between the terminal devices 101, 102 and 103 and the server 105. The network

104 may include various types of connections, for example, wired or wireless communication links, or optical fiber cables.

A user may use the terminal devices 101, 102 and 103 to interact with the server 105 via the network 104, to receive or send a message, etc. The terminal devices 101, 102 and 103 may be electronic devices such as a mobile phone, a computer and a tablet. Chart software for drawing charts is installed in the terminal devices 101, 102 and 103. The user may input chart entities in the chart software, to cause the chart software to automatically configure, based on a set of chart entities that is composed of the chart entities, the colors corresponding to the chart entities.

The terminal devices 101, 102 and 103 may be hardware or software. When being the hardware, the terminal devices 101, 102 and 103 may be various electronic devices, the electronic devices including, but not limited to a television, a smartphone, a tablet computer, an e-book reader, a vehicle-mounted computer, a laptop portable computer, a desktop computer, and the like. When being the software, the terminal devices 101, 102 and 103 may be installed in the above listed electronic devices. The terminal devices 101, 102 and 103 may be implemented as a plurality of pieces of software or a plurality of software modules (e.g., software or software modules for providing a distributed service), or may be implemented as a single piece of software or a single software module, which will not be specifically defined here.

The server 105 may be a server providing various services. For example, after the terminal devices 101, 102 and 103 acquire the chart entities inputted by the user, the server 105 may determine target color information corresponding to the chart entities based on a preset target function and a constraint condition, and then send the target color information to the terminal devices 101, 102 and 103, to cause the terminal devices 101, 102 and 103 to configure the colors corresponding to the chart entities based on the target color information.

It should be noted that the server 105 may be hardware or software. When being the hardware, the server 105 may be implemented as a distributed server cluster composed of a plurality of servers, or may be implemented as a single server. When being the software, the server 105 may be implemented as a plurality of pieces of software or a plurality of software modules (e.g., software or software modules for providing a distributed service), or may be implemented as a single piece of software or a single software module, which will not be specifically defined here.

It should be noted that the method for configuring a color provided in embodiments of the present disclosure may be performed by the terminal devices 101, 102 and 103, or performed by the server 105. Correspondingly, the apparatus for configuring a color may be provided in the terminal devices 101, 102 and 103, or in the server 103.

It should be appreciated that the numbers of the terminal devices, the networks, and the servers in FIG. 1 are merely illustrative. Any number of terminal devices, networks, and servers may be provided based on actual requirements.

Figure 2:
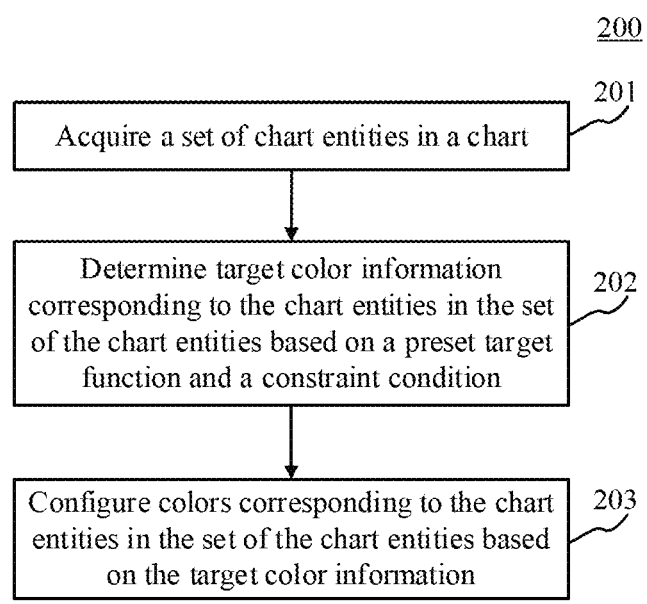
FIG. 2 is a flowchart of a method for configuring a color according to an embodiment of the present disclosure.

Further referring to FIG. 2, FIG. 2 illustrates a flow 200 of a method for configuring a color according to an embodiment of the present disclosure. The method for configuring a color in this embodiment includes the following steps:

Step 201, acquiring a set of chart entities in a chart.

In this embodiment, an executing body (e.g., the server 105 or the terminal devices 101, 102 and 103 in FIG. 1) may acquire, from a local database, a set of chart entities in a chart required to be configured with a color, or may acquire, from an other electronic device in a connection pre-established with the executing body, a set of chart entities in a chart required to be configured with a color, which is not limited in this embodiment. Here, the set of the chart entities in the chart includes a plurality of chart entities, and the chart entities refer to entity objects for representing the contents of the chart. The entity objects may include, but not limited to, a chart subject object, a data object of the chart, a subject description object of the chart, and the like. Here, the chart subject object refers to a thing to which the chart is directed, the data object of the chart refers to data of the thing to which the chart is directed, and the subject description object of the chart refers to description information of the thing to which the chart is directed. For example, if the chart is a statistical chart for population of a city, the chart subject object may be the city, the data object of the chart may be population data of each city, and the subject description object of the chart may be a city profile of the city.

Step 202, determining target color information corresponding to the chart entities in the set of the chart entities based on a preset target function and a constraint condition.

In this embodiment, the preset target function is an optimization function constructed based on a degree of association between a chart entity and color information and/or a degree of diversity of colors. The constraint condition is a boundary condition when the target function is solved, which is used to select optimal target color information under the constraint condition, to enable the target function to take an extreme value to realize the optimal solution to the color determination. The optimal solution to a color here refers to that a color can accurately reflect the meaning of a chart entity and/or a degree of diversity of colors is high. Alternatively, the determining target color information corresponding to the chart entities in the set of the chart entities based on a preset target function and a constraint condition may include: performing a substitution on the target function based on the chart entities in the set of the chart entities, and solving optimally the target function under the constraint condition, to determine the target color information. Here, the target function may include a parameter corresponding to a chart entity and a parameter corresponding to a color. The optimization solution approach may be implemented in an existing way of solving optimally the problem, which will not be repeatedly described here.

Specifically, after acquiring the chart entities corresponding to the set of the chart entities, the executing body may first determine that the numerical value corresponding to the each chart entity. Here, the numerical value may be determined using a mapping relationship between a chart entity and a numerical value. Then, the executing body may substitute the numerical value corresponding to the each chart entity into the target function, and optimally solve the target function under the constraint of the constraint condition on the target function, to obtain a numerical value outputted from the target function and corresponding to each color. Then, the executing body may determine the target color information based on the numerical value corresponding to the each color. Here, the target color information is used to describe the colors corresponding to the chart entities in the set of the chart entities, and the expression form of the target color information may be the above numerical value corresponding to the each color, or may be a color category converted from the numerical value, which is not limited in this embodiment.

Step 203, configuring colors corresponding to the chart entities in the set of the chart entities based on the target color information.

In this embodiment, after determining and obtaining the target color information, the executing body may configure, for each chart entity in the set of the chart entities, the chart entity according to the corresponding color of the chart entity in the target color information, such that the chart entity is displayed according to the corresponding color.

Figure 3:
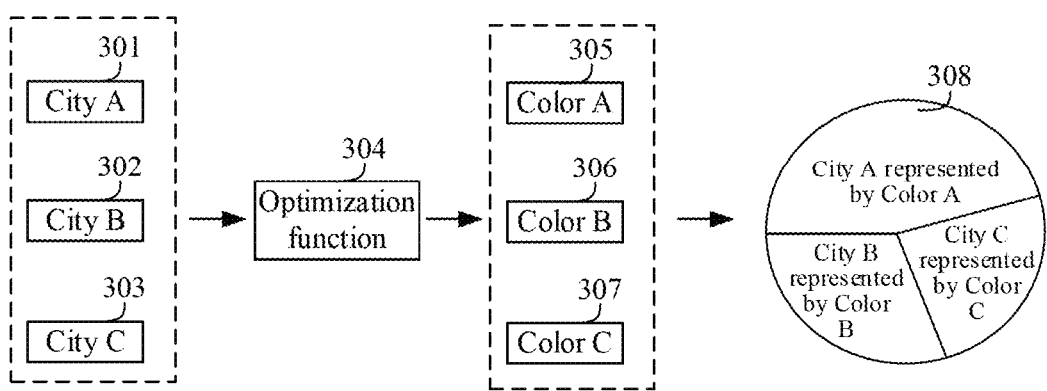
FIG. 3 is a schematic diagram of an application scenario of the method for configuring a color according to an embodiment of the present disclosure.

Further referring to FIG. 3, FIG. 3 is a schematic diagram of an application scenario of the method for configuring a color according to an embodiments of the present disclosure. In the application scenario of FIG. 3, the executing body may first acquire a set of chart entities in a chart required to be configured with a color. The set of the chart entities includes a city A 301, a city B 302 and a city C 303. Thereafter, based on the set of the chart entities and an optimization function 304, the executing body may optimally solve the optimization function 304 under a constraint condition, to obtain target color information corresponding to the chart entities. The target color information may include a color A 305 corresponding to the city A, a color B 306 corresponding to the city B, and a color C 307 corresponding to the city C. Thereafter, the executing body may configure the colors corresponding to the chart entities based on the target color information to obtain a chart 308 after the color configuration. In the chart 308, the city A may be represented by the color A, the city B may be represented by the color B, and the city C may be represented by the color C.

According to the method for configuring a color provided in the above embodiment of the present disclosure, the color configuration problem of the chart entities can be regarded as an optimization problem. Based on the target function and the constraint condition, the chart entities are substituted to obtain the optimal solution, and thus, the colors corresponding to the chart entities required to be configured are determined and obtained. The automatic configuration of the colors for the chart entities is realized based on the colors, thereby improving the efficiency of the color configuration. Moreover, the degree of association between the colors and the chart entities may be taken into consideration when the constraint condition is constructed, such that the target color information determined based on the target function and the constraint function can have a high degree of association with the chart entities, which improves the degree of matching between the determined colors and the chart entities. In addition, when the target function is constructed, the degree of association between the colors and the chart entities may be taken into consideration, and the degree of diversity of the colors may also be taken into consideration, such that the colors in the finally obtained target color information are abundant, which improves the degree of distinction between the chart entities.

Figure 4:
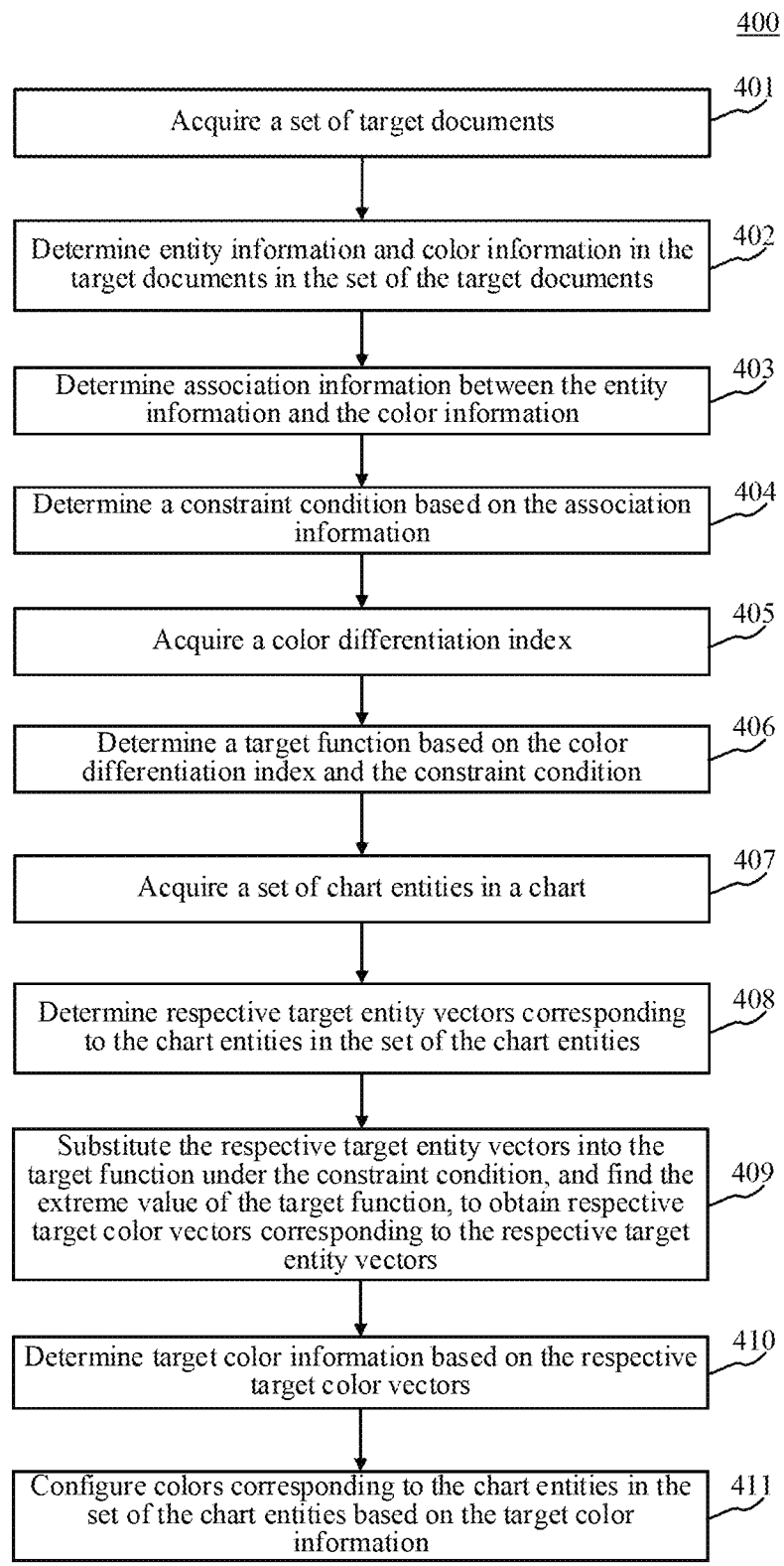
FIG. 4 is a flowchart of a method for configuring a color according to another embodiment of the present disclosure.

Further referring to FIG. 4, FIG. 4 illustrates a flow 400 of the method for configuring a color according to another embodiment of the present disclosure. As shown in FIG. 4, the method for configuring a color in this embodiment may include the following steps:

Step 401, acquiring a set of target documents.

In this embodiment, the set of the target documents may include a plurality of target documents, each of which includes an entity and a color. An executing body may crawl the text content containing both the entity and the color in the network through the crawler technology, and perform intercepting based on the text content to generate a target document. The executing body may also acquire, from a local database, each target document inputted by a user, to obtain a set of target documents.

Step 402, determining entity information and color information in the target documents in the set of the target documents.

In this embodiment, for each target document in the set of the target documents, the executing body may perform a semantic analysis on the target document to obtain the entity information and color information in the target document. Here, the semantic analysis may refer to an existing semantic analysis technique, which will not be repeatedly described here. Here, the entity information refers to information that can be statisticized by a chart and has entity content, for example, a city name. For example, if the target document contains the following description information "the color of buildings in a city A is mainly a color A," the city A may be determined as the entity information, and the color A may be determined as the color information.

Step 403, determining association information between the entity information and the color information.

In this embodiment, after performing the semantic analysis on the each target document to obtain the entity information and the color information, the executing body may further analyze and determine a degree of association between the entity information and the color information to obtain the association information. Alternatively, the executing body may calculate an association value for describing the degree of association between the entity information and the color information, based on frequencies at which the entity information and the color information occur in the same target document, a distance between the entity information and the color information in the document, and/or a grammatical association between the entity information and the color information, or the like. The executing body may use the association value as the association information.

In some alternative implementations of this embodiment, the determining association information between the entity information and the color information includes: determining a set of entity vectors based on the entity information; determining a set of color vectors based on the color information; performing a dot product operation on the entity vectors in the set of the entity vectors and the color vectors in the set of the color vectors, to determine dot product information; and determining the association information between the entity information and the color information based on the dot product information.

In this implementation, the executing body may first convert each entity in the entity information into a corresponding entity vector to obtain the set of the entity vectors, and convert each color in the color information into a corresponding color vector to obtain the set of the color vectors. Here, the executing body may obtain a word vector corresponding to the each entity based on a vector generation approach in the natural language processing technology, and the word vector is the entity vector. Similarly, the executing body may obtain the color vector corresponding to the each color based on the vector generation approach. The vector generation approach here may include, but not limited to, a vector mapping technique based on a neural network, a dimension reduction processing technique for a co-occurrence matrix of words, a mapping approach based on a preset knowledge library, and the like, which is not limited in this embodiment. Further, after acquiring the each entity vector and the each color vector, the executing body may perform a dot product operation on the each entity vector and the each color vector, to obtain dot product information. The dot product information may be a dot product value obtained through the dot product operation, and association information is then determined based on the dot product value. Here, the association information is used to describe a degree of association between an entity vector and a color vector, and the larger the dot product value is, the higher the degree of association between the entity vector and the color vector is.

Step 404, determining a constraint condition based on the association information.

In this embodiment, the association information may be a dot product value of the each entity vector and the each color vector. The executing body may determine the constraint condition based on a sum of dot product values of entity vectors and color vectors. The constraint condition may be obtained based on the following formula:

$$f = \Sigma_{k=0}^{l} i_k \cdot c_k$$

Here, $f$ refers to a constraint function, l refers to a number of entities, $i_k$ refers to a k-th chart entity vector, and $c_k$ refers to a k-th color vector.

Step 405, acquiring a color differentiation index.

In this embodiment, the color differentiation index is used to measure a degree of diversity of colors. The color differentiation index may be constructed based on an information entropy, or based on an other approach, which is not limited in this embodiment.

In some alternative implementations of this embodiment, the color differentiation index includes a color entropy. The acquiring a color differentiation index includes: determining the color entropy based on a color category and an information entropy calculation formula.

In this embodiment, in the situation where the color differentiation index is constructed based on the information entropy, the color differentiation index may include the color entropy. A specific color entropy may be determined based on the following formula:

$$h(C) = \Sigma_{c \in C} p(c) \log p(c)$$

Here, h(C) refers to a color entropy, c refers to a color category, and p(c) refers to a probability of a value of the color category. As can be seen, the color entropy can be calculated and obtained based on the substitution of the color category into the information entropy calculation formula.

Step 406, determining a target function based on the color differentiation index and the constraint condition.

In this embodiment, since the purpose of the optimization of the color configuration is that the larger color differentiation is better and the higher degree of association between the color and the entity is better, the degree of association between the color and the entity may be measured based on the constraint condition, and a degree of differentiation between colors may be measured based on the color differentiation index. Specifically, the target function may be determined and obtained based on the following formula:

$$l = f - \beta h(c)$$

Here, l refers to the target function, $f$ refers to the constraint function, h(c) refers to the color entropy, and $\beta$ refers to a hyperparameter.

Step 407, acquiring a set of chart entities in a chart.

In this embodiment, for the detailed description for step 407, reference is made to the detailed description for step 201, which will not be repeatedly described here.

Step 408, determining respective target entity vectors corresponding to the chart entities in the set of the chart entities.

In this embodiment, for each chart entity in the set of the chart entities, the target entity vector corresponding to the chart entity may be determined according to the above vector generation approach, to obtain the respective target entity vectors corresponding to the chart entities.

Step 409, substituting the respective target entity vectors into the target function under the constraint condition, and finding an extreme value of the target function, to obtain respective target color vectors corresponding to the respective target entity vectors.

In this embodiment, the executing body may use the above constraint function as the constraint condition for the optimization solution, and substitute the respective target entity vectors into the target function to find the extreme value of the target function, for example, solve the maximum value of the target function. The executing body may determine target color vectors when the value of the target function is at the maximal in the situation where the constraint condition is satisfied, and determine these target color vectors as the respective target color vectors corresponding to the respective target entity vectors. Here, a number of entities in the constraint condition at this time may be the number of the target entity vectors, and the color category at this time may refer to color vectors corresponding to different colors.

Step 410, determining target color information based on the respective target color vectors.

In this embodiment, the executing body may determine the target color information corresponding to the respective target color vectors based on the above vector generation approach.

Step 411, configuring colors corresponding to the chart entities in the set of the chart entities based on the target color information.

In this embodiment, for the detailed description for step 411, reference is made to the detailed description for step 203, which will not be repeatedly described here.

According to the method for configuring a color provided in the above embodiment of the present disclosure, the constraint condition may also be constructed based on the association information between the entity information and the color information in the target documents in the set of the target documents, such that the constraint condition can reflect the degree of association between the entities and the colors. Accordingly, by determining and obtaining the target function based on the constraint condition and the color differentiation index, the target function can reflect the degree of association between the entities and the colors and the degree of differentiation between the colors, and further, the colors determined and obtained based on the target function can be matched with the chart entities and can be more diversified, thereby improving the effect of the determined colors.

Figure 5:
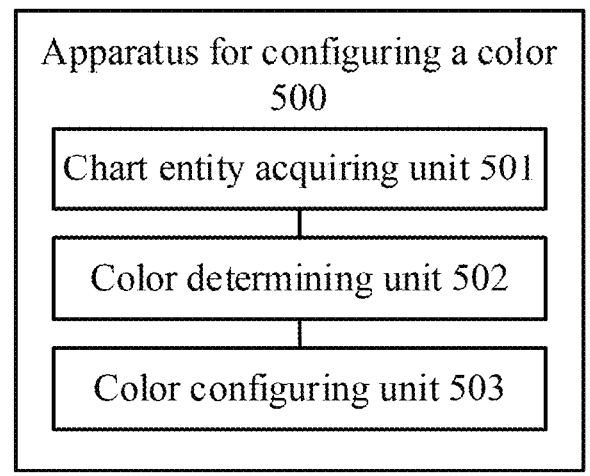
FIG. 5 is a schematic structure diagram of an apparatus for configuring a color according to an embodiment of the present disclosure.

Further referring to FIG. 5, as an implementation of the method shown in the above drawings, an embodiment of the present disclosure provides an apparatus for configuring a color. The embodiment of the apparatus corresponds to the embodiment of the method shown in FIG. 2, and the apparatus may be applied in various servers or terminal devices.

As shown in FIG. 5, the apparatus 500 for configuring a color in this embodiment includes: a chart entity acquiring unit 501, a color determining unit 502 and a color configuring unit 503.

The chart entity acquiring unit 501 is configured to acquire a set of chart entities in a chart.

The color determining unit 502 is configured to determine target color information corresponding to the chart entities in the set of the chart entities based on a preset target function and a constraint condition.

The color configuring unit 503 is configured to configure colors corresponding to the chart entities in the set of the chart entities based on the target color information.

In some alternative implementations of this embodiment, the color determining unit 502 is further configured to: determine respective target entity vectors corresponding to the chart entities in the set of the chart entities; substitute the respective target entity vectors into the target function under the constraint condition, and find the extreme value of the target function, to obtain respective target color vectors corresponding to the respective target entity vectors; and determine the target color information based on the respective target color vectors.

In some alternative implementations of this embodiment, the apparatus further includes: a document acquiring unit, configured to acquire a set of target documents; an information determining unit, configured to determine entity information and color information in the target documents in the set of the target documents; an association determining unit, configured to determine association information between the entity information and the color information; and a constraint determining unit, configured to determine the constraint condition based on the association information.

In some alternative implementations of this embodiment, the association determining unit is further configured to: determine a set of entity vectors based on the entity information; determine a set of color vectors based on the color information; perform a dot product operation on the entity vectors in the set of the entity vectors and the color vectors in the set of the color vectors, to determine dot product information; and determine the association information between the entity information and the color information based on the dot product information.

In some alternative implementations of this embodiment, the above apparatus further includes a function determining unit, configured to acquire a color differentiation index, and determine the target function based on the color differentiation index and the constraint condition.

In some alternative implementations of this embodiment, the color differentiation index includes a color entropy. The function determining unit is further configured to: determine the color entropy based on a color category and an information entropy calculation formula.

It should be understood that the units 501-503 described in the apparatus 500 for configuring a color correspond to the steps in the method described with reference to FIG. 2, respectively. Thus, the above operations and features described for the method for configuring a color are also applicable to the apparatus 500 and the units contained therein, which will not be repeatedly described here.

According to embodiments of the present disclosure, an electronic device, a readable storage medium, and a computer program product are further provided.

Figure 6:
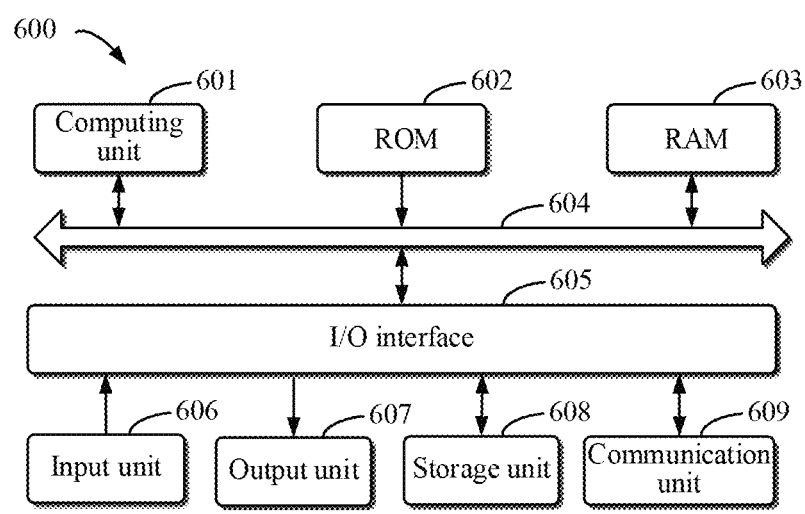
FIG. 6 is a block diagram of an electronic device used to implement a method for configuring a color according to embodiments of the present disclosure.

FIG. 6 is a schematic block diagram of an example of electronic device 600 that may be used to implement embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital assistant, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, the device 600 includes a computing unit 601, which may execute various appropriate actions and processes in accordance with a computer program stored in a read-only memory (ROM) 602 or a computer program loaded into a random access memory (RAM) 603 from a storage unit 608. The RAM 603 also stores various programs and data required by operations of the device 600. The computing unit 601, the ROM 602 and the RAM 603 are connected to each other through a bus 604. An input/output (I/O) interface 605 is also connected to the bus 604.

A plurality of components in the device 600 are coupled to the I/O interface 605, including: an input unit 606, such as a keyboard or a mouse; an output unit 607, such as various types of displays, or speakers; the storage unit 608, such as a disk or an optical disk; and a communication unit 609 such as a network card, a modem, or a wireless communication transceiver. The communication unit 609 allows the device 600 to exchange information/data with other devices over a computer network such as the Internet and/or various telecommunication networks.

The computing unit 601 may be various general-purpose and/or dedicated processing components having processing and computing capabilities. Some examples of the computing unit 601 include, but are not limited to, central processing unit (CPU), graphics processing unit (GPU), various dedicated artificial intelligence (AI) computing chips, various computing units running machine learning model algorithms, digital signal processor (DSP), and any appropriate processors, controllers, microcontrollers, etc. The computing unit 601 performs the various methods and processes described above, such as the method for configuring a color. For example, in some embodiments, the method for configuring a color may be implemented as a computer software program, which is tangibly included in a machine readable medium, such as the storage unit 608. In some embodiments, part or all of the computer program may be loaded and/or installed on the device 600 via the ROM 602 and/or the communication unit 609. When the computer program is loaded into the RAM 603 and executed by the computing unit 601, one or more steps of the method for configuring a color described above may be performed. Alternatively, in other embodiments, the computing unit 601 may be configured to perform the method for configuring a color by any other appropriate means (for example, by means of firmware).

Various embodiments of the systems and technologies described in this article may be implemented in digital electronic circuit systems, integrated circuit systems, field programmable gate arrays (FPGA), application specific integrated circuits (ASIC), application-specific standard products (ASSP), system-on-chip (SOC), complex programmable logic device (CPLD), computer hardware, firmware, software, and/or their combinations. These various embodiments may include: being implemented in one or more computer programs, the one or more computer programs may be executed and/or interpreted on a programmable system including at least one programmable processor, the programmable processor may be a dedicated or general-purpose programmable processor that may receive data and instructions from a storage system, at least one input apparatus, and at least one output apparatus, and transmit the data and instructions to the storage system, the at least one input apparatus, and the at least one output apparatus.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of some embodiments of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In order to provide interaction with a user, the systems and technologies described herein may be implemented on a computer, the computer has: a display apparatus (e.g., CRT (cathode ray tube) or LCD (liquid crystal display) monitor for displaying information to the user; and a keyboard and a pointing apparatus (for example, a mouse or trackball), the user may use the keyboard and the pointing apparatus to provide input to the computer. Other kinds of apparatuses may also be used to provide interaction with the user; for example, the feedback provided to the user may be any form of sensory feedback (for example, visual feedback, auditory feedback, or tactile feedback); and may use any form (including acoustic input, voice input, or tactile input) to receive input from the user.

The systems and technologies described herein may be implemented in a computing system (e.g., as a data server) that includes back-end components, or a computing system (e.g., an application server) that includes middleware components, or a computing system (for example, a user computer with a graphical user interface or a web browser, through which the user may interact with the embodiments of the systems and technologies described herein) that includes front-end components, or a computing system that includes any combination of such back-end components, middleware components, or front-end components. The components of the system may be interconnected by any form or medium of digital data communication (e.g., a communication network). Examples of the communication network include: local area network (LAN), wide area network (WAN), and Internet.

The computer system may include a client and a server. The client and the server are generally far from each other and usually interact through a communication network. The client and server relationship is generated by computer programs operating on the corresponding computer and having client-server relationship with each other. The server can be a cloud server, a server for a distributed system, or a server combined with blockchain.

It should be understood that various forms of processes shown above may be used to reorder, add, or delete steps. For example, the steps described in the present disclosure may be performed in parallel, sequentially, or in different orders, as long as the desired results of the technical solution disclosed in embodiments of the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for configuring a color, performed by a server, the method comprising: constructing a preset target function based on a color entropy and a constraint condition, wherein the color entropy is for measuring a degree of differentiation between colors, and the constraint condition is constructed based on parameters including an entity vector and a color vector and is for measuring a degree of association between a color and an entity; acquiring a set of chart entities in a chart; determining target color information corresponding to the chart entities in the set of the chart entities based on the preset target function and the constraint condition, wherein the preset target function is an optimization function with an optimization purpose of maximizing the degree of differentiation between colors and maximizing degrees of associations between colors and entities; and configuring colors corresponding to the chart entities in the set of the chart entities based on the target color information, and displaying the chart entities and the colors correspondingly on a terminal wherein the determining the target color information corresponding to the chart entities in the set of the chart entities based on the preset target function and the constraint condition comprises: determining respective target entity vectors corresponding to the chart entities in the set of the chart entities; substituting the respective target entity vectors into the preset target function under the constraint condition, solving an extreme value of the preset target function, determining color vectors obtained from the preset target function when the preset target function is at the extreme value in a situation where the constraint condition is satisfied as target color vectors, and determining the target color vectors as the target color information corresponding to the chart entities in the set of the chart entities.

2. The method according to claim 1, wherein before constructing the preset target function, the method further comprises:
   acquiring a set of target documents, wherein the set of target documents includes a plurality of target documents and each target document contains an entity and a color;
   performing semantic analysis on the plurality of target documents to determine entities and colors contained in the plurality of target documents, and determining association information between the entities and the colors;
   determining the constraint condition based on the association information.

3. The method according to claim 1, further comprising:
   acquiring a set of target documents;

determining entity information and color information in the target documents in the set of the target documents;
determining association information between the entity information and the color information; and
determining the constraint condition based on the association information.

4. The method according to claim 3, wherein the determining the association information between the entity information and the color information comprises:
determining a set of entity vectors based on the entity information;
determining a set of color vectors based on the color information;
performing a dot product operation on the entity vectors in the set of the entity vectors and the color vectors in the set of the color vectors, to determine dot product information; and
determining the association information between the entity information and the color information based on the dot product information.

5. The method according to claim 1, further comprising:
acquiring a color differentiation index; and
determining the preset target function based on the color differentiation index and the constraint condition.

6. The method according to claim 5, wherein the color differentiation index comprises the color entropy, and
the acquiring the color differentiation index comprises:
determining the color entropy based on a color category and an information entropy calculation formula.

7. An apparatus for configuring a color, comprising: at least one processor; and a memory storing instructions, the instructions when executed by the at least one processor, cause the at least one processor to perform operations, the operations comprising: constructing a preset target function based on a color entropy and a constraint condition, wherein the color entropy is for measuring a degree of differentiation between colors, and the constraint condition is constructed based on parameters including an entity vector and a color vector and is for measuring a degree of association between a color and an entity; acquiring a set of chart entities in a chart; determining target color information corresponding to the chart entities in the set of the chart entities based on the preset target function and the constraint condition, wherein the preset target function is an optimization function with an optimization purpose of maximizing the degree of differentiation between colors and maximizing degrees of associations between colors and entities; and configuring colors corresponding to the chart entities in the set of the chart entities based on the target color information, and displaying the chart entities and the colors correspondingly on a terminal wherein the determining the target color information corresponding to the chart entities in the set of the chart entities based on the preset target function and the constraint condition comprises: determining respective target entity vectors corresponding to the chart entities in the set of the chart entities; substituting the respective target entity vectors into the preset target function under the constraint condition, solving an extreme value of the preset target function, determining color vectors obtained from the preset target function when the preset target function is at the extreme value in a situation where the constraint condition is satisfied as target color vectors, and determining the target color vectors as the target color information corresponding to the chart entities in the set of the chart entities.

8. The apparatus according to claim 7, wherein before constructing the preset target function, the method further comprises:
acquiring a set of target documents, wherein the set of target documents includes a plurality of target documents and each target document contains an entity and a color;
performing semantic analysis on the plurality of target documents to determine entities and colors contained in the plurality of target documents, and determining association information between the entities and the colors;
determining the constraint condition based on the association information.

9. The apparatus according to claim 7, wherein the operations further comprise:
acquiring a set of target documents;
determining entity information and color information in the target documents in the set of the target documents;
determining association information between the entity information and the color information; and
determining the constraint condition based on the association information.

10. The apparatus according to claim 9, wherein determining the association information between the entity information and the color information comprises:
determining a set of entity vectors based on the entity information;
determining a set of color vectors based on the color information;
performing a dot product operation on the entity vectors in the set of the entity vectors and the color vectors in the set of the color vectors, to determine dot product information; and
determining the association information between the entity information and the color information based on the dot product information.

11. The apparatus according to claim 7, wherein the operations further comprise:
acquiring a color differentiation index; and
determining the preset target function based on the color differentiation index and the constraint condition.

12. The apparatus according to claim 11, wherein the color differentiation index comprises the color entropy, and
the acquiring the color differentiation index comprises:
determining the color entropy based on a color category and an information entropy calculation formula.

13. A non-transitory computer readable storage medium, storing a computer instruction, wherein the computer instruction is used to cause a computer to perform operations, the operations comprising: constructing a preset target function based on a color entropy and a constraint condition, wherein the color entropy is for measuring a degree of differentiation between colors, and the constraint condition is constructed based on parameters including an entity vector and a color vector and is for measuring a degree of association between a color and an entity; acquiring a set of chart entities in a chart; determining target color information corresponding to the chart entities in the set of the chart entities based on the preset target function and the constraint condition, wherein the preset target function is an optimization function with an optimization purpose of maximizing the degree of differentiation between colors and maximizing degrees of associations between colors and entities; and configuring colors corresponding to the chart entities in the set of the chart entities based on the target color information, and displaying the chart entities and the colors correspondingly on a terminal, wherein the determining the target color information corresponding to the chart entities in the set of the chart entities based on the preset target function and the constraint condition comprises: determining respective target entity vectors corresponding to the chart entities in the set of the chart entities; substituting the respective target entity vectors into the preset target function under the constraint condition, solving an extreme value of the preset target function, determining color vectors obtained from the preset target function when the preset target function is at the extreme value in a situation where the constraint condition is satisfied as target color vectors, and determining the target color vectors as the target color information corresponding to the chart entities in the set of the chart entities.

14. The non-transitory computer readable storage medium according to claim 13, wherein before constructing the preset target function, the method further comprises:
   acquiring a set of target documents, wherein the set of target documents includes a plurality of target documents and each target document contains an entity and a color;
   performing semantic analysis on the plurality of target documents to determine entities and colors contained in the plurality of target documents, and determining association information between the entities and the colors;
   determining the constraint condition based on the association information.

15. The non-transitory computer readable storage medium according to claim 13, wherein the operations further comprise:
   acquiring a set of target documents;
   determining entity information and color information in the target documents in the set of the target documents;
   determining association information between the entity information and the color information; and
   determining the constraint condition based on the association information.

16. The non-transitory computer readable storage medium according to claim 15, wherein the determining the association information between the entity information and the color information comprises:
   determining a set of entity vectors based on the entity information;
   determining a set of color vectors based on the color information;
   performing a dot product operation on the entity vectors in the set of the entity vectors and the color vectors in the set of the color vectors, to determine dot product information; and
   determining the association information between the entity information and the color information based on the dot product information.

17. The non-transitory computer readable storage medium according to claim 13, wherein the operations further comprise:
   acquiring a color differentiation index; and
   determining the preset target function based on the color differentiation index and the constraint condition.

18. The non-transitory computer readable storage medium according to claim 17, wherein the color differentiation index comprises the color entropy, and
   the acquiring the color differentiation index comprises:
   determining the color entropy based on a color category and an information entropy calculation formula.

* * * * *